(12) United States Patent
Cox et al.

(10) Patent No.: US 8,982,450 B2
(45) Date of Patent: Mar. 17, 2015

(54) METHODS AND APPARATUS FOR BROADBAND FREQUENCY COMB STABILIZATION

(71) Applicants: Jonathan A. Cox, La Mesa, CA (US); Franz X. Kaertner, Cambridge, MA (US)

(72) Inventors: Jonathan A. Cox, La Mesa, CA (US); Franz X. Kaertner, Cambridge, MA (US)

(73) Assignee: Massachusetts Institute of Technology, MA (US)

( * ) Notice: Subject to any disclaimer, the term of this patent is extended or adjusted under 35 U.S.C. 154(b) by 0 days.

(21) Appl. No.: 14/196,442

(22) Filed: Mar. 4, 2014

(65) Prior Publication Data

US 2014/0185635 A1 Jul. 3, 2014

Related U.S. Application Data

(63) Continuation of application No. PCT/US2012/055096, filed on Sep. 13, 2012.

(60) Provisional application No. 61/534,511, filed on Sep. 14, 2011.

(51) Int. Cl.
*H01S 3/13* (2006.01)
*G02F 1/35* (2006.01)
(Continued)

(52) U.S. Cl.
CPC .......... *H01S 3/1305* (2013.01); *H01S 3/1307* (2013.01); *H01S 3/0085* (2013.01); *H01S 3/1304* (2013.01); *H01S 3/2391* (2013.01); *H01S 3/0057* (2013.01); *H01S 3/0092* (2013.01)
USPC .............. 359/326; 372/18; 372/32

(58) Field of Classification Search
USPC .............. 359/326–332; 372/18, 32
See application file for complete search history.

(56) References Cited

U.S. PATENT DOCUMENTS 6,493,091 B2 * 12/2002 Kourogi et al. .............. 356/489
6,654,394 B1 11/2003 Sellin et al.
(Continued)

FOREIGN PATENT DOCUMENTS

WO WO 2010063051 A1 * 6/2010 ............ H01S 3/13

OTHER PUBLICATIONS

Borchers et al., "Carrier-envelope phase stabilization with sub-10 as residual timing jitter", Optical Society of America, Optics Letters, vol. 36, No. 21, Nov. 1, 2011.
(Continued)

*Primary Examiner* — Daniel Petkovsek
(74) *Attorney, Agent, or Firm* — Cooley LLP

(57) ABSTRACT

Feedback loops can be used to shift and stabilize the carrier-envelope phase of a frequency comb from a mode-locked fibers laser or other optical source. Compared to other frequency shifting and stabilization techniques, feedback-based techniques provide a wideband closed-loop servo bandwidth without optical filtering, beam pointing errors, or group velocity dispersion. It also enables phase locking to a stable reference, such as a Ti:Sapphire laser, continuous-wave microwave or optical source, or self-referencing interferometer, e.g., to within 200 mrad rms from DC to 5 MHz. In addition, stabilized frequency combs can be coherently combined with other stable signals, including other stabilized frequency combs, to synthesize optical pulse trains with pulse durations of as little as a single optical cycle. Such a coherent combination can be achieved via orthogonal control, using balanced optical cross-correlation for timing stabilization and balanced homodyne detection for phase stabilization.

24 Claims, 6 Drawing Sheets

(51) Int. Cl.
*H01S 3/00* (2006.01)
*H01S 3/23* (2006.01)

(56) References Cited

U.S. PATENT DOCUMENTS

2003/0185255 A1* 10/2003 Ye et al. ............... 372/18
2004/0017833 A1   1/2004 Cundiff et al.
2007/0086713 A1   4/2007 Ingmar et al.
2008/0292326 A1  11/2008 Ferrero et al.
2011/0235661 A1   9/2011 Grebing et al.

OTHER PUBLICATIONS

Canova et al., "Carrier-envelope phase stabilization and control using a transmission grating compressor and an AOPDF", Optical Society of America, Optics Letters, vol. 34, No. 9, May 1, 2009.
Chen et al., "1-mJ, sbu-5-fs carrier-envelope phase-locked pulses", Applied Physics B (2010) 99: pp. 149-157.
Fordell et al., "Carrier-envelope phase stabilization of a multi-millijoule, regenerative-amplifier-based chirped-pulse amplifier system", Optics Express, vol. 17, No. 23, Nov. 9, 2009.
Forget et al., "Closed-loop carrier-envelope phase stabilization with an acousto-optic programmable dispersive filter", Optical Society of America, Optics Letters, vol. 34, No. 23, Dec. 1, 2009.
International Search Report and Written Opinion, issued Dec. 14, 2012, in counterpart International Patent Application No. PCT/US2012/055096.
Jones et al., "Stabilization of Femtosecond Lasers for Optical Frequency Metrology and Direct Optical to Radio Frequency Sysnthesis", The American Physical Society, Physical Review Letters, vol. 86, No. 15, Apr. 9, 2001.
Koke et al., "Direct frequency comb synthesis with arbitrary offset and shot-noise-limited phase noise", Nature Photonics, Letters, vol. 4, Jul. 2010.
Tamura et al., "77-fs pulse generation from a stretched-pulse mode-locked all-fiber ring laser", Optical Society of America, Optics Letters, vol. 18, No. 13, Jul. 1, 1993.

* cited by examiner (a) Time Domain (b) Frequency Domain

METHODS AND APPARATUS FOR BROADBAND FREQUENCY COMB STABILIZATION

CROSS-REFERENCES TO RELATED APPLICATIONS

This application is a bypass continuation application of International Patent Application No. PCT/US2012/055096, which was filed on Sep. 13, 2012, and which claims the benefit, under 35 U.S.C. §119(e), of U.S. Provisional Patent Application No. 61/534,511, filed on Sep. 14, 2011, entitled "Broadband Frequency Comb Synthesis of Diffraction Limited, Ultrafast Pulse Train with an Acousto-Optic Frequency Shifter in Feedback Configuration," which applications are hereby incorporated herein by reference in their respective entireties.

GOVERNMENT SUPPORT

This invention was supported, in whole or in part, by Department of Energy grant DE-SC0005262 and Air Force Office of Scientific Research grant FA9550-10-1-0063. The Government has certain rights in this invention.

BACKGROUND

Frequency combs based on ultrafast lasers and other frequency comb sources are immensely powerful tools for a wide range of applications. Exemplary frequency comb sources include mode-locked lasers, which generate optical frequency combs that, when broadened, can span octave bandwidths. An optical frequency comb appears in the time domain as an optical pulse train, which can be characterized as a high-frequency carrier modulated by an envelope that pulses at a predetermined repetition rate $f_{rep}$. The repetition rate equals the speed of light in the laser cavity divided by the round-trip length of the laser cavity and may be on the order of Megahertz or Gigahertz rates. Each pulse in the pulse train can be as brief as one to several optical cycles, e.g., pulse widths of picoseconds, femtoseconds, or even attoseconds.

FIG. 1 shows a time-domain representation (top) and a frequency-domain representation (bottom) of an exemplary optical frequency comb. In the time domain, the comb appears as a narrow Gaussian envelope (dotted line 10) that modulates the amplitude of a carrier oscillating at the laser frequency (solid line 12). In the frequency domain, the Fourier transform of the envelope is a broad Gaussian 20 that modulates the amplitude of the frequency comb, which has orders 22 spaced at the repetition frequency, $f_{rep}$.

The frequency comb 22 in FIG. 1 can also be characterized by its carrier-envelope phase (or absolute phase), which is the phase of the envelope with respect to the phase of the carrier. In mode-locked lasers, the carrier-envelope phase may vary as function of time, e.g., it may advance or recede with successive pulses in the pulse train. If the carrier-envelope phase changes by $\Delta\phi$ with each successive pulse, as shown in FIG. 1, then the carrier-envelope offset (CEO) frequency can be expressed as:

$$f_{CEO} = \frac{\Delta\varphi \bmod 2\pi}{2\pi} f_{rep}.$$

The CEO frequency appears in the frequency domain as a displacement of the frequency comb from dc. Without stabilization, the carrier-envelope phase may drift as the laser cavity changes temperature, vibrates, changes refractive index, or experiences other environmental or optical perturbations.

SUMMARY

Embodiments of the present invention include systems and methods for generating shifted frequency combs. In one example, a system includes a frequency comb generator, such as a mode-locked fiber laser or a microcavity driven by a single-frequency laser, that generates a frequency comb. This exemplary system also includes a frequency-shifting device, such as an acousto-optic frequency shifter or single-sideband modulator, that produces the shifted frequency comb based on the frequency comb and an error signal. And it includes a detector that senses a phase difference between the shifted frequency comb and a reference signal and provides the error signal based on the phase difference.

In some cases, the phase difference may be proportional to the carrier-envelope phase of the shifted frequency comb. If so, the frequency-shifting device can be further configured to produce the shifted frequency comb by shifting the frequency comb in frequency by an amount proportional to a rate of change associated with the phase difference.

In another example, the system may also comprise a controller to cause the frequency-shifting device to shift one or more first pulses of the frequency comb by a first frequency shift and to shift one or more second pulses of the frequency comb by a second frequency shift. For example, the controller may cause the frequency-shifting device to shift the first pulses by an amount sufficient to stabilize the carrier-envelope phase of the first pulses, and it may cause the frequency-shifting device not to shift the second pulses at all. In other words, the first frequency shift may compensate for changes in the carrier-envelope phase, and the second frequency shift may be zero.

In some cases, the detector comprises one or more photodetectors to sense in-phase and quadrature components of the shifted frequency comb relative to the reference signal. This detector may vary a phase of the error signal based on the in-phase and quadrature components. The system may also include a voltage-controlled oscillator (VCO) that receives the error signal from the detector and drives the frequency-shifting device with an output whose oscillation frequency proportional to the amplitude of the error signal. In these cases, the VCO's output remains substantially constant even as the phase difference changes.

An exemplary system may also include a reference-signal generator that generates the reference signal. For instance, this reference-signal generator may include an interferometer that produces the reference signal based on the shifted frequency comb and a decimated or frequency-multiplied version of the shifted frequency comb. It could also include a laser or microwave oscillator.

Yet another embodiment comprises a system for generating a shifted frequency comb with a stabilized carrier-envelope phase. Such a system comprises a laser that generates an optical frequency comb and a reference signal generator to produce a reference signal. It also includes a frequency-shifting device that produces the shifted frequency comb from the optical frequency comb by shifting the optical frequency comb in frequency by an amount proportional to an error signal so as to stabilize the carrier-envelope phase of the shifted frequency comb. In addition, this system includes a detector that senses a phase difference between a carrier of the shifted frequency comb and an envelope of the shifted frequency comb. The detector, which may include one or more photodetectors operably coupled to a voltage-controlled oscillator, varies the phase of the error signal based on the phase difference.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
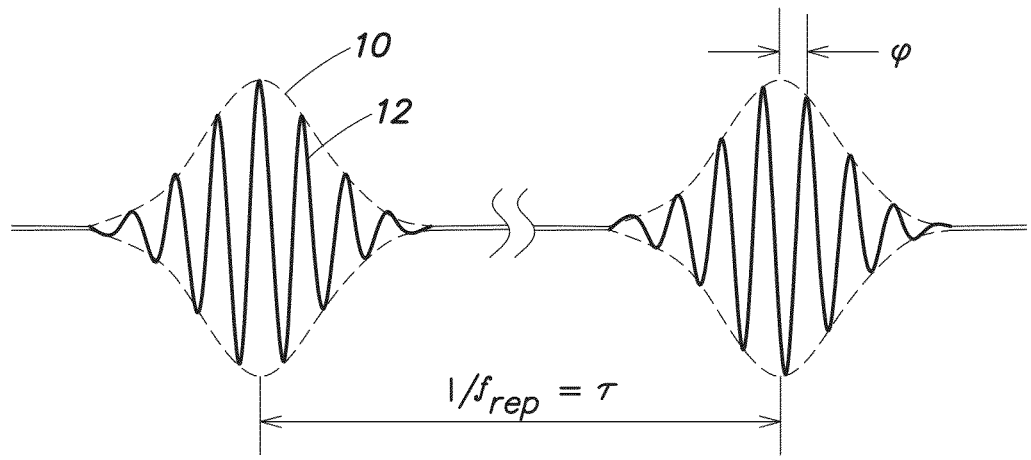
FIG. 1 shows a time-domain representation (top) and a frequency-domain representation (bottom) of a frequency comb.
Figure 1:
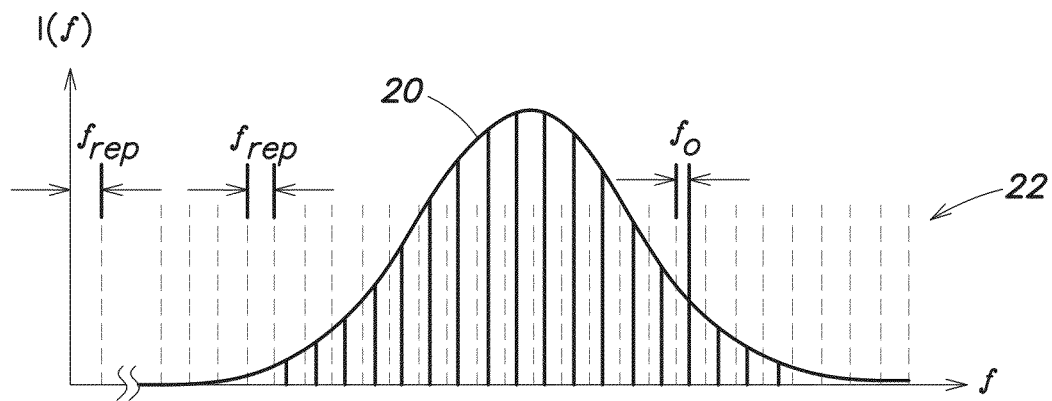

Following below are more detailed descriptions of various concepts related to, and embodiments of, inventive systems, methods and apparatus for stabilizing broadband frequency combs, synthesizing stabilized broadband frequency combs, and coherently combining stabilized broadband frequency combs. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Exemplary techniques for carrier-envelope phase (CEP) stabilization involve implementing feedback using a frequency-shifting device, such as an acousto-optic frequency shifter (AOFS) or a single-sideband (SSB) electro-optic modulator, in a fiber-based, octave-spanning supercontinuum source. In one example, the frequency-shifting device is positioned in the optical path before the supercontinuum generation and amplifier. The CEP can be locked to any suitable reference signal, including those generated by sufficiently stable sources (e.g., Ti:Sapphire lasers, HeNe lasers and other continuous-wave optical sources, and microwave oscillators). Other suitable reference signals include decimated or frequency-multiplied versions of the stabilized frequency comb itself, such as those generated with "self-referencing" 1f-2f interferometers.

Incorporating a frequency shifter in a feedback configuration within a fiber-laser based supercontinuum system provides a number of significant benefits and eliminates many drawbacks of other CEP stabilization techniques. For instance, feedback-based CEP stabilization does not couple significantly to the pulse envelope timing (repetition rate), unlike CEP stabilization by modulating the laser oscillator pump power, which couples to the CEP via intracavity nonlinear dynamics. Feedback-based CEP stabilization can also be used in applications such as coherent pulse synthesis (discussed below), which benefits from independent control of the pulse timing and the CEP to sub-femtosecond precision. In addition, feedback-based CEP stabilization can be used to shift the CEP by larger amounts than pump power modulation for certain GHz repetition rate fiber lasers. Feedback-based CEP stabilization can also work over larger bandwidths (e.g., MHz bandwidths) than pump power modulation, which has a useful bandwidth of only a few tens of kilohertz due to filtering by laser dynamics or delay in the modulating element.

Feedback for CEP stabilization also offers advantages over feed-forward CEP stabilization. In feed-forward stabilization, an acousto-optic frequency shifter (AOFS) in a feed-forward configuration stabilizes the CEP outside of the laser cavity by directly frequency shifting the oscillator output. Feed-forward techniques have several limitations. First, they stabilize only the relatively narrow portion of the optical spectrum that satisfies the Bragg condition. Second, the AOFS frequency modulation leads to significant spread of beam pointing versus frequency. Third, for short pulses (e.g., <<10 fs), the long path length (e.g., 1-10 cm) through the AOFS medium (typically fused silica or $TeO_2$) requires additional dispersion compensation. Finally, feed-forward configurations are susceptible to slow drifts from temperature fluctuations in the microwave electronics and cables which are not accounted for. These temperature fluctuations can cause phase changes that are unacceptable for coherent beam combining or attosecond science experiments. In contrast, feedback techniques produce beams whose carrier-envelope phases are stable enough over the long term, e.g., tens of minutes to many hours, that the beams can be coherently combined with other stabilized beams.

A frequency comb with a stabilized carrier-envelope phase (CEP) or fixed carrier-envelope offset (CEO) frequency has applications in precision spectroscopy, frequency metrology, frequency transfer, and exoplanet detection, among other things. For example, stabilized frequency combs can be used to calibrate astronomical spectrographs. Highly precise and highly accurate calibration of astronomical spectrographs would enable astronomers to measure the slight periodic shifts caused by an orbiting planet in a distant star's emission spectrum. Stabilized frequency combs can also be coherently combined with beams from other stable sources as discussed below.

Stabilizing the Carrier-Envelope Phase with an AOFS Feedback Loop

Figure 2:
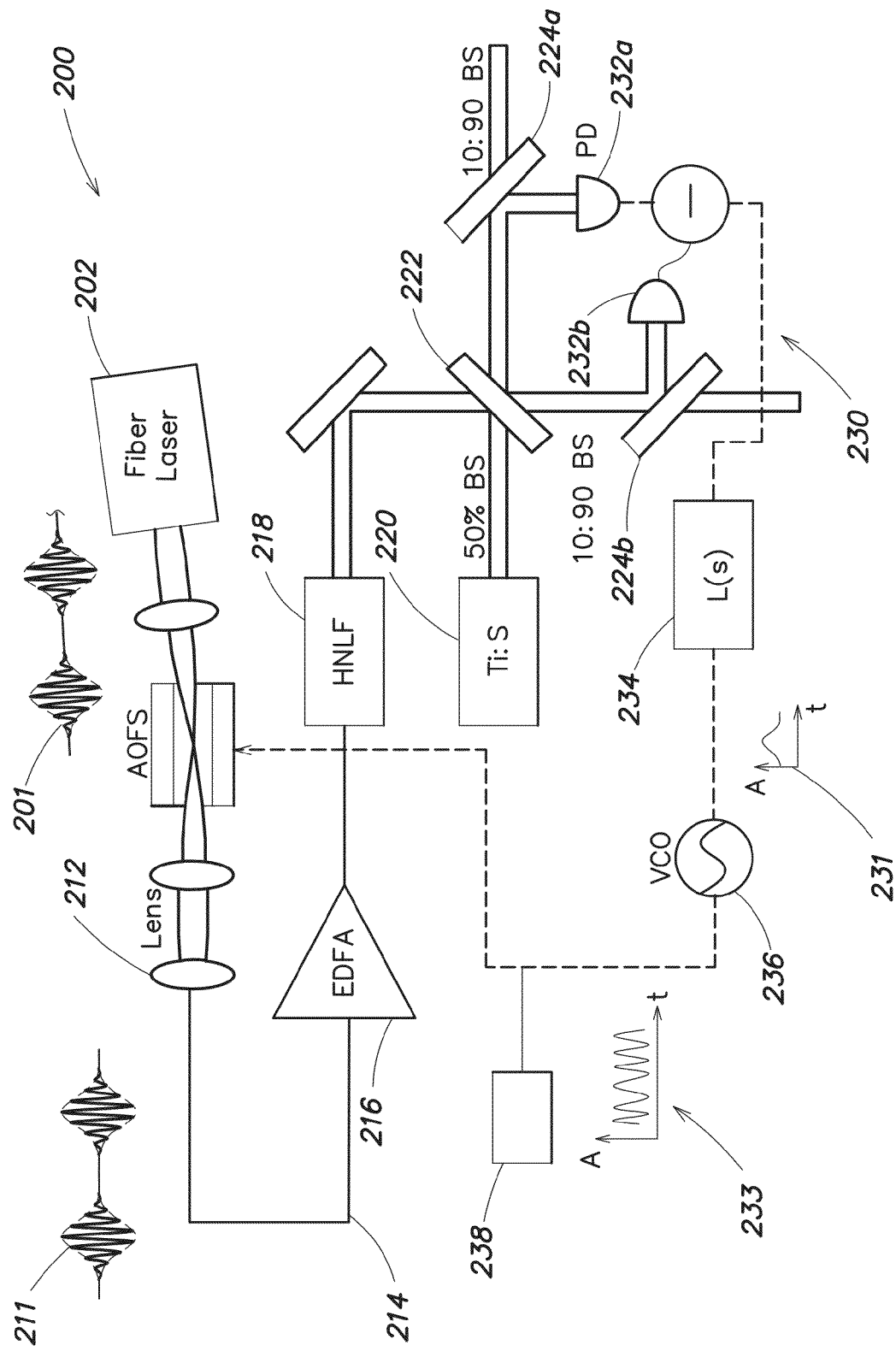
FIG. 2 is a schematic of an exemplary carrier-envelope phase-locking system according to embodiments of the present invention.

FIG. 2 shows a schematic of a mode-locked laser system 200 stabilized using an acousto-optic frequency shifter 210 in a feedback configuration. The system 200 includes a mode-locked fiber laser 202, which emits a frequency comb 201 (also characterized as an optical pulse train). Temperature fluctuations, pressure changes, pump power fluctuations, nonlinear refractive index changes, and other environmental and optical perturbations cause the CEP of this frequency comb 201 to vary. In some cases, the CEP may vary in an undesired or unpredictable manner.

The frequency comb 201 illuminates an acousto-optic frequency shifter (AOFS) 210, which diffracts the frequency comb 201 by an angle proportional to the oscillation frequency of a drive signal from a voltage-controlled oscillator (VCO) 236. This acousto-optically induced diffraction also shifts the diffracted beam's frequency with respect the incident beam by an amount equal to the oscillation frequency of the drive signal, which is produced in a feedback loop that includes the AOFS 210. For example, the AOFS 210 may shift the frequency comb 201 by up to ±5 MHz (or possibly more, depending on the AOFS bandwidth). As a result, the diffracted beam is a frequency-shifted version 211 of the frequency comb 201 emitted by the fiber laser 202, or simply a "shifted frequency comb" 211.

One or more lenses 214 couple the shifted frequency comb 211 into a single-mode fiber 212, which in turn couples the shifted frequency comb 211 into an optical amplifier, shown in FIG. 2 as an erbium-doped fiber amplifier (EDFA) 214. The shifted frequency comb 211 saturates the EDFA 214, which amplifies the shifted frequency comb 211 and couples it into a highly nonlinear fiber 218. The highly nonlinear fiber 218 emits a supercontinuum output, which is temporally compressed to 8 fs with prisms (not shown) and combined with the output of a Ti:Sapphire laser 220 on a 50% beam splitter 222. The Ti:Sapphire laser 220 acts a stable reference source, and its output serves as a reference signal to which the shifted frequency comb's CEP is locked.

The shifted frequency comb 211 and the reference signal from the Ti:Sapphire laser 220 interfere at the beam splitter 222, which directs complementary outputs to respective 10%:90% beam splitters 224a and 224b. These beam splitters 224a and 224b tap 10% of the resulting signals onto respective photosensors 232a and 232b in a balanced photodetector 230. The balanced photodetector 230 subtracts the outputs of the photosensors 232a and 232b to yield an error signal 231, also called a locking signal, that is proportional to (e.g., equal to) the beat note between the reference signal and the shifted frequency comb. A proportional-integral-derivative (PID) loop filter 234 filters this error signal 231 and uses the filtered error signal to drive the VCO 236, which in turn drives the AOFS 210, closing the feedback loop. For instance, the loop filter output may vary the oscillation frequency of the VCO output 233. In some cases, this oscillation frequency may be nominally at or near the center frequency of the AOFS bandwidth (e.g., 175 MHz±10 MHz).

The system 200 may also include a controller 238 operably coupled to the AOFS 210, the VCO 236, the detector 230, and/or the loop filter 234. This controller 238 can be implemented as any suitable computer processor or computer processing device. If desired, the controller 238 may monitor and adjust parameters (e.g., gain) associated with the feedback loop. It may also selectively apply the VCO output 233 to the AOFS 210 such that only some of the pulses emitted by the mode-locked laser 202 are stabilized or shifted in frequency. For example, the controller 238 may cause the AOFS 210 to generate a shifted frequency comb 211 that is a stabilized, decimated version of the frequency comb 201 emitted by the laser 202. Alternatively, the controller 238 may shift different pulses by different amounts, or it may cause phase difference between the carrier and pulse envelope to change at a predetermined rate or in a predetermined fashion.

The system 200 shown in FIG. 2 has many advantages over other CEP stabilization systems. First, placing the AOFS 210 after the fiber laser 212 but before the EDFA 216 and the highly-non-linear fiber 218 reduces (and may even eliminate) beam pointing errors since the shifted frequency comb is coupled back into the single-mode fiber 214. Second, saturating the EDFA 216 reduces (and may even eliminate) power fluctuations caused by changes in the AOFS driving power and frequency. Third, the AOFS 210 operates where the optical bandwidth is narrowest, reducing group-velocity dispersion, optical filtering effects, and diffraction effects to negligible levels. Fourth, because the fiber laser 202 has diffraction-limited beam quality, the frequency comb can be focused through the AOFS 210 to a small spot size (e.g., <<100 μm). Focusing to a small spot reduces the effects of acoustic propagation delays in the AOFS 210, which might otherwise limit the feedback loop bandwidth to a few tens of kilohertz. Fifth, the feedback loop reduces effects of drift in the cables, electronics, and photodetectors. Sixth, the VCO 234 maintains the AOFS driving signal at a constant amplitude, regardless of the optical power detected by the photodetector 230, so CEP fluctuations do not affect the amplitude of the shifted frequency comb diffracted by the AOFS 210. Finally, using a VCO 236 eliminates the need for a mixer with a DC-coupled RF port.

Those skilled in the art of optics and frequency comb generation will readily appreciate that other configurations are possible as well. For instance, the system could be a free-space system instead of a fiber-based system. It could use a single-sideband modulator instead of an AOFS. The AOFS can be placed after the optical amplifier instead of before the optical amplifier. And the AOFS could be used in a double-pass configuration instead of the single-pass configuration shown in FIG. 2. Other modifications are possible as well.

Self-Referencing with a 1f-2f Interferometer

Figure 3:
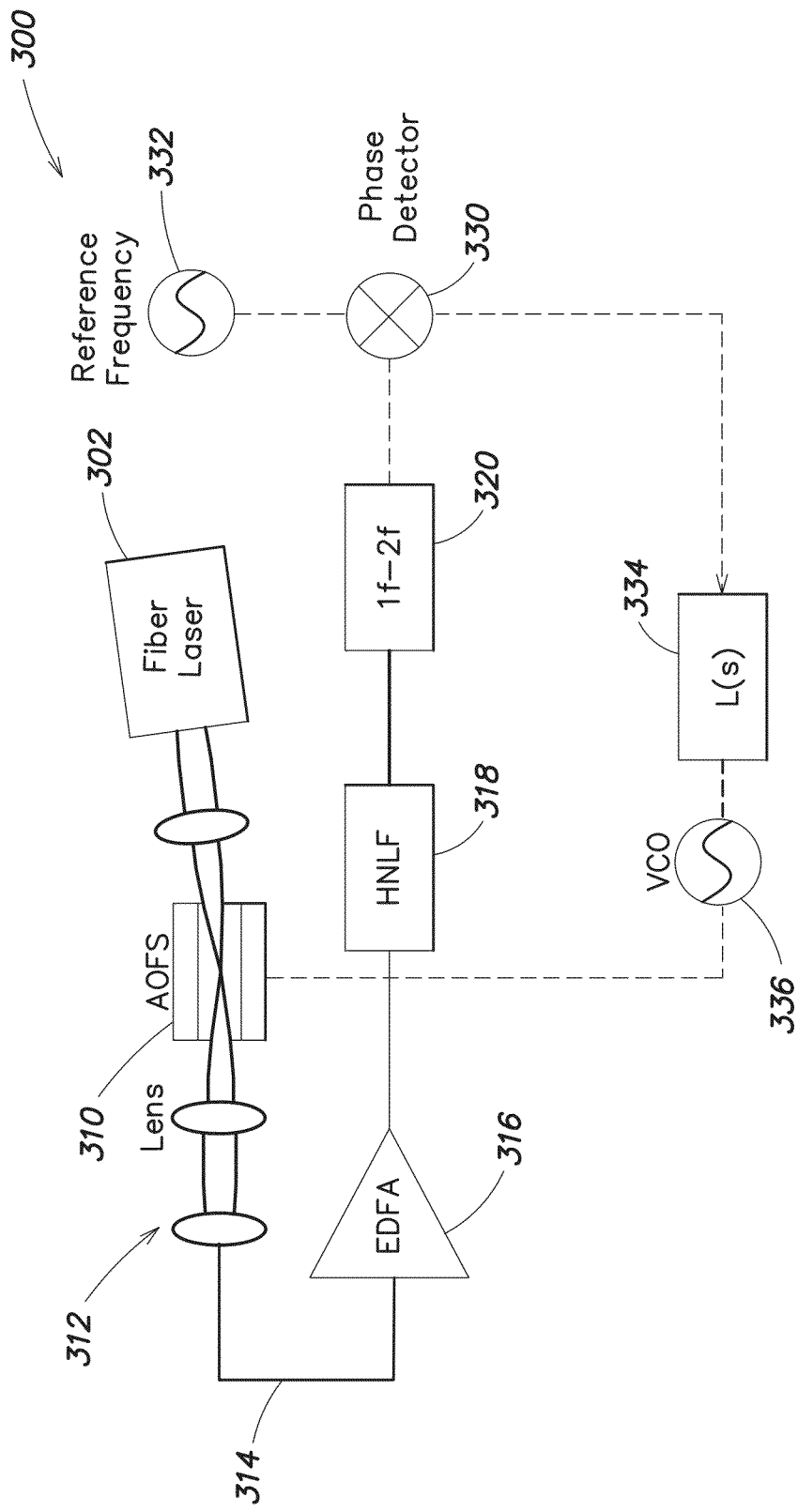
FIG. 3 is a schematic diagram of carrier-envelope frequency offset locking using a 1f-2f interferometer to directly detect the carrier-envelope offset frequency of a mode-locked fiber laser according to embodiments of the present invention.

FIG. 3 shows another system 300 for generating stabilized frequency combs. Like the system 200 shown in FIG. 2, this system 300 includes a mode-locked fiber laser 302 that emits a frequency comb. An AOFS 310 shifts the frequency of the frequency comb to produce a shifted frequency comb that is coupled by one or more lenses 312 into a single-mode fiber 314. The shifted frequency comb is then amplified with an EDFA 316 and directed through a highly nonlinear fiber 318 to generate a broadened version of the shifted frequency comb (also called a supercontinuum output).

This supercontinuum output is coupled into a self-referencing interferometer, shown in FIG. 3 as an f:2f interferometer 320. As understood by those of skill in the art, the self-referencing interferometer emits the heterodyne beat between the shifted frequency comb and a harmonic of the shifted frequency comb (e.g., the second harmonic). This harmonic can be generated by frequency-multiplying at least a portion of the shifted frequency comb using a nonlinear crystal or other nonlinear material or structure. The heterodyne beat proportional to the carrier-envelope offset frequency. (In the f:2f interferometer 320, the beat note's frequency equals the carrier-envelope offset frequency.)

A phase detector 330, such as a balanced photodetector, optically coupled to the f:2f interferometer 320 detects the heterodyne beat emitted by the f:2f interferometer 320. The detected carrier-envelope offset frequency is locked to a suitable microwave frequency standard from a microwave oscillator 332, then passed through a PID loop filter 334 before being used to drive a VCO 336. The VCO's output drives the AOFS 310 to complete the feedback loop.

Continuous Wave Reference Signals

Other embodiments may include different types of reference signal generators in addition to or instead of a pulsed reference source like the Ti:Sapphire laser shown in FIG. 1. For instance, the reference signal may be a stable continuous-wave (CW) signal from a CW laser reference, such as a highly stable HeNe laser. Other suitable reference signals include CW microwave signals like those generated by highly stable electronic microwave oscillators, such as Sapphire Loaded Cavity Oscillators.

Coherent Beam Combining

Stabilized frequency combs can be combined with other stable frequency combs to synthesize multi-octave frequency combs, to generate high power beams, and to synthesize optical pulse trains with pulse widths on the order of a single cycle of the carrier wave. Single-cycle sources can be used for phase-sensitive nonlinear optics, including optically driven field emission, carrier wave Rabi flopping, and high harmonic generation.

In many coherent synthesis systems, attosecond-precision measurement and control of the technical and quantum noise of uncorrelated optical oscillators yields a single coherent frequency comb. This control can be achieved across more than two hundred terahertz of bandwidth to the sub-cycle level. To date, progress toward single-cycle optical pulse synthesis has relied on coherent combination of multi-branch, non-linear spectral generation from a single master oscillator. In such an approach the high-speed fluctuations in carrier phase and pulse timing between spectral branches are common, since they come from the same source. And schemes based on nonlinear spectral generation from a single oscillator are limited by the nonlinear broadening and compression mechanisms, and often produce outputs with spectral gaps.

Stabilized frequency combs can also be coherently combined used to synthesize ultrafast optical pulse trains without the limitations associated with nonlinear spectral generation and uncorrelated oscillators. In addition, coherent synthesis of independently generated laser beams provides more flexibility for single-cycle frequency comb synthesis, allowing the synthesized spectrum to be tailored for the application of interest, because each sub-comb can be shaped and controlled in beam size independently.

Figure 4:
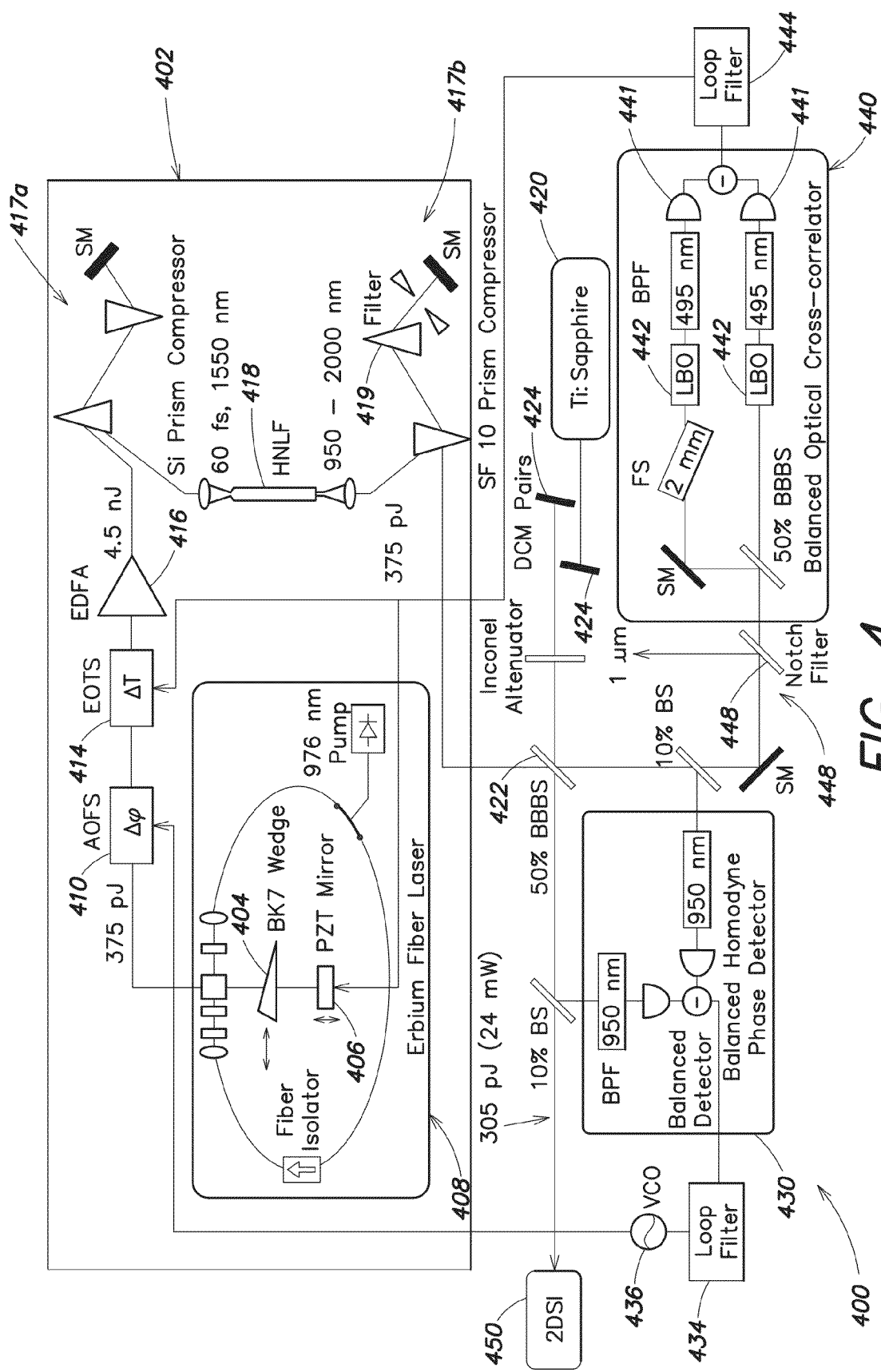
FIG. 4 is a schematic diagram of the carrier-envelope phase-locking system of FIG. 2 modified for coherent beam combining according to embodiments of the present invention.

FIG. 4 is a schematic diagram of a coherent synthesis system 400 which combines a broadened stabilized frequency comb from a fiber supercontinuum source 402 with the output of a Kerr-lens mode-locked Ti:Sapphire laser 420. In this case, the fiber supercontinuum source's output (e.g., 1.0-1.4 µm, with 8 fs pulses) is locked to the Ti:Sapphire laser's output (6 fs pulses), and the two outputs are coherently combined to create a pulse train with nearly single-cycle pulses (e.g., 3.7 fs pulses). This coherent combination is achieved via orthogonal, attosecond-precision synchronization of both pulse envelope timing and carrier envelope phase using balanced optical cross-correlation and balanced homodyne detection in combination with one or more electro-optic timing shifters (EOTS) 414 and one or more acousto-optic frequency shifters (AOFS) 410 in properly designed feedback loops, respectively. A two-dimensional spectral shearing interferometer (2DSI) 450 retrieves the resulting pulse envelope, which may be only 1.1 optical cycles long.

The fiber supercontinuum source 402 is driven by a stretched-pulse, passively mode-locked erbium fiber laser 408. It includes an intracavity glass wedge 404 to compensate for slow changes in the carrier-envelope phase using feedback signals from a balanced homodyne phase detector 430. In one example, this laser 408 has a timing jitter of 2.6 fs rms from 10 kHz to the Nyquist frequency as measured against another nearly identical fiber laser. Furthermore, measuring the absolute jitter of this exemplary laser 408 against the negligible noise of the Ti:Sapphire laser 420 above 10 kHz confirms that the timing jitter is 2.6 fs rms to the Nyquist frequency.

The frequency comb emitted by the fiber laser 408 passes through an AOFS 410, which shifts the frequency comb according to a feedback signal from a VCO 436 to complete a first feedback loop. The shifted frequency comb emitted by the AOFS 410 propagates through an electro-optic timing shifter 414, which forms part of a second feedback loop with a balanced optical cross-correlator 440. As understood by those skilled in the art, the electro-optic timing shifter 414 may be implemented as a waveguide lithium niobate electro-optic phase modulator or other suitable device. An EDFA 416 amplifies the resulting signal (e.g., to 4.5 nJ), which propagates through a first pulse compressor 417a (shown as a silicon prism pair) that compresses the pulse width (e.g., to about 60 fs). The compressed pulses propagate through a highly nonlinear fiber 418 (e.g., a Ge-doped, small core fiber), which generates a broadened shifted frequency comb (e.g., an octave-spanning supercontinuum). A spatial filer 419 transmits the short-wavelength portion (e.g., below 1.4 µm) of this supercontinuum, and this short-wavelength portion is compressed with a second silicon prism compressor 417b (e.g., to about 8 fs) before being directed to a 50% broadband beamsplitter 422. For instance, the beam splitter 422 may be broadband in that it has flat group delay and transmission characteristics across a wide band, e.g. from 600 nm to 1500 nm.

The Ti:Sapphire laser 420 also generates an optical frequency comb, albeit a very stable one. Since the Ti:Sapphire laser 420 exhibits such exceptionally low high-frequency timing jitter (e.g., at the few attosecond level), a feedback system locks the fiber supercontinuum source 402 to the more stable Ti:sapphire laser 420 (also called a master oscillator). Double chirped mirrors 424 compress the Ti:Sapphire master oscillator's output, which may span 700-1000 nm, to a pulse width that is closer to the transform-limited pulse width (e.g., 6 fs). The pulses from the Ti:Sapphire laser 420 are combined with the broadened stabilized frequency comb from the fiber supercontinuum source 402 on the beam splitter 422.

Half of the light combined on the beamsplitter 422 is coupled into a balanced optical cross-correlator 440 for timing synchronization. The cross-correlator 440 detects the pulse envelope timing error and feeds back an error signal to the electro-optic timing shifter 414 via a loop filter 444 and the piezo-electric mirror 406. The intracavity piezo mirror 406 and the electro-optic timing shifter 414 respond to this error signal by changing the cavity length and/or external path length, respectively, so as to advance or retard subsequent pulses from the fiber laser 402. Curved mirrors, lenses, or other focusing elements (not shown) focus the light into non-linear crystals 442 (e.g., lithium triborate crystals) in the cross-correlator 440. If the pulses from the fiber continuum source 402 and the Ti:Sapphire laser 420 overlap temporally and spatially as they propagate through the crystals 442, they will mix to produce a sum-frequency pulse (e.g., at 495 nm) that is detected by balanced photodiodes 441 in the cross-correlator 440. (Focusing the pulses helps to avoid spatiotemporal effects that might otherwise cause the cross-correlator 440 to lock the pulses with a 500 fs offset.) A notch filter 448 (e.g., with a passband beyond 1 µm) suppresses second-harmonic generation from the nonlinear crystals 442 that might otherwise corrupt the sum-frequency pulse(s).

After the system 400 obtains a tight timing lock, a balanced homodyne phase detector 430 detects the CEP between the frequency combs from the fiber laser 402 and the Ti:Sapphire laser 420. The balanced homodyne detector 430 emits an output signal whose amplitude varies sinusoidally with the carrier-envelope phase. A PID loop filter 434 coupled to the phase detector 430 drives a VCO 436 with a filtered version of this output signal to produce a feedback signal whose oscillation frequency varies with the carrier-envelope frequency. In turn, this feedback signal drives both the intracavity wedge 404 and the AOFS 410.

Moving the wedge 404 into or out of the beam path within the cavity of the fiber laser 408 provides coarse CEP adjustment (slow feedback). Then, fast feedback upon a low-noise, VCO 436 (e.g., at a center frequency of 175 MHz) drives an AOFS 410 and locks the relative CEP slip or carrier-envelope offset frequency to zero. The AOFS 410 achieves a carrier-envelope offset frequency shift of ±5 MHz in a single pass. (Switching to a double-pass configuration for the AOFS 410 would cancel angular walk-off.) Moreover, coupling the relatively narrowband (e.g., about 60 nm) output of the fiber laser 408 into the AOFS 410 before the EDFA 416 and the highly nonlinear fiber 418 reduces diffractive broadening. In addition, feedback CEP stabilization reduces slow drift associated with feed forward.

Figure 5A:
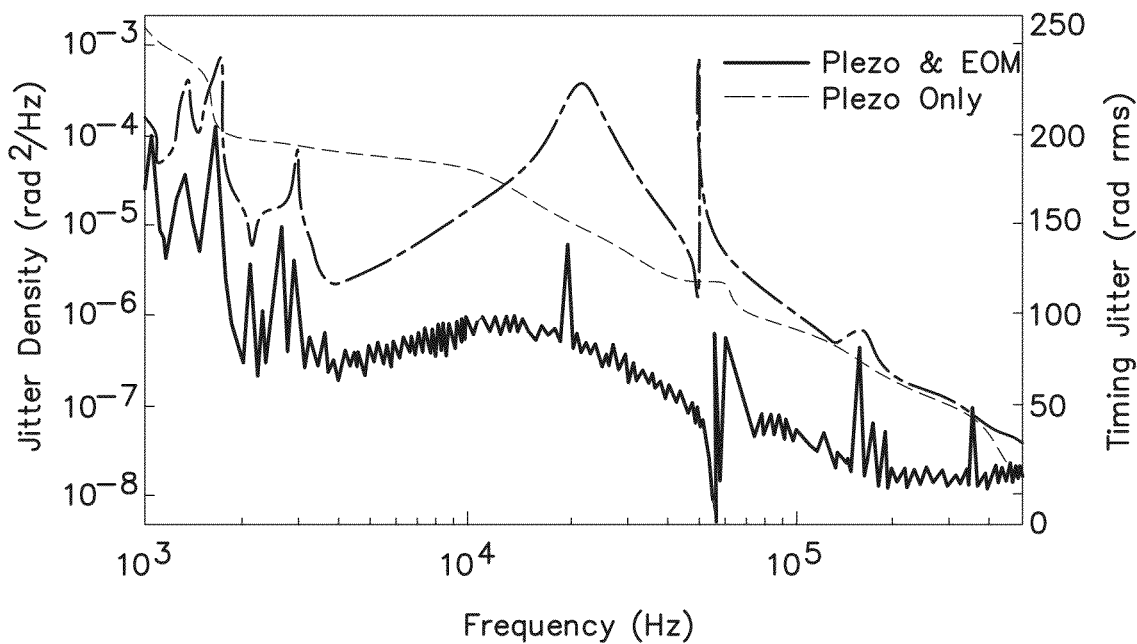
FIG. 5A is a plot of timing jitter spectral density and cumulatively integrated timing jitter between the fiber supercontinuum source and the Ti:Sapphire master laser shown in FIG. 4, as measured at the balanced optical cross-correlator.

FIG. 5A is a plot of timing jitter spectral density and cumulatively integrated timing jitter between the fiber supercontinuum source 402 and the Ti:Sapphire master laser 420 shown in FIG. 4, as measured at the balanced optical cross-correlator. The integrated timing jitter after engaging only the intracavity piezo mirror 406 is about 2.2 fs rms (dash-dotted line). Enabling the extra-cavity waveguide electro-optic time shifter 414 reduces the jitter to about 250 attoseconds rms (1 kHz, 1 MHz) (solid line). This is well below the single-cycle level, as shown by the integrated timing jitter (dashed line). It also provides a locking range of several femtoseconds. Fortunately, the electro-optic timing shifter 414 imparts little to no CEP shift since the bulk of the timing jitter is at low frequencies, where it is removed by the fast CEP feedback, and because the phase and group delay are to within 4% of each other for the lithium niobate in the electro-optic timing shifter 414.

Figure 5B:
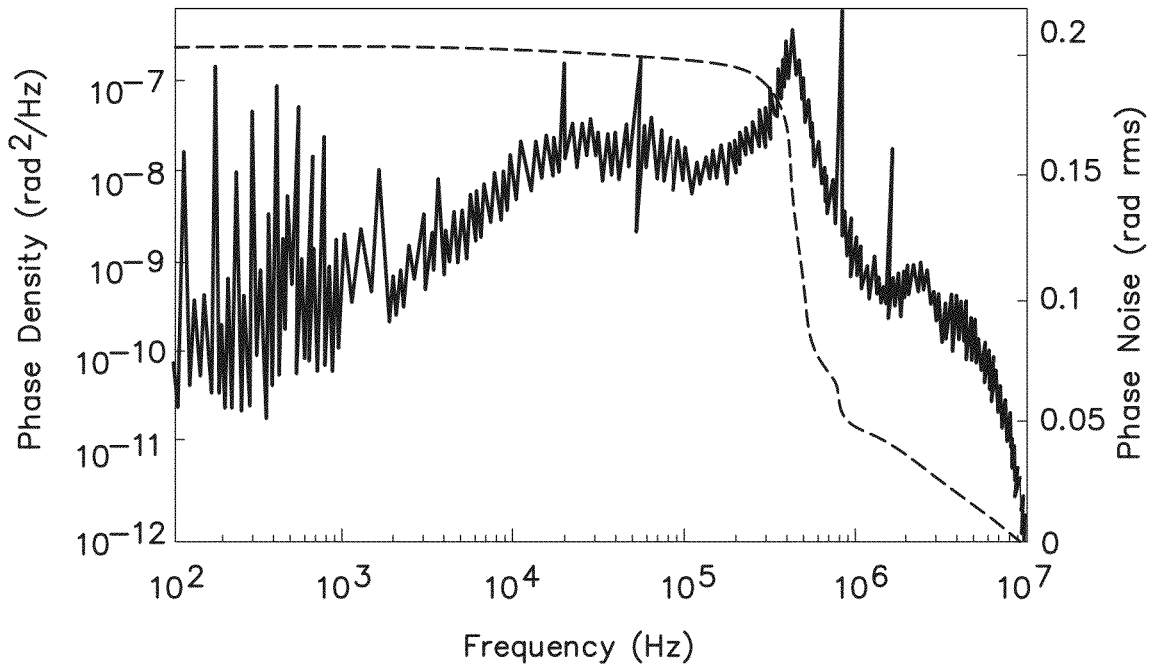
FIG. 5B is a plot of the residual carrier envelope offset (CEO) phase noise (shown above) between the fiber supercontinuum source and the Ti:Sapphire reference laser shown in FIGS. 2 and 4 when the CEO is locked to zero offset.

FIG. 5B is a plot of the residual carrier envelope offset phase noise (shown above) between fiber supercontinuum source and Ti:Sapphire reference laser shown in FIGS. 2 and 4 when the CEO is locked to zero offset. The residual noise is only 220 mrad rms from DC to 5 MHz (the detector gain bandwidth). FIG. 5B shows that feedback-based CEP stabilization results in long-term stable synchronization within 200 mrad rms with 450 kHz closed-loop bandwidth. CEP shifting via pump power modulation is not possible because it results in a nonlinear timing shift of at least 0.1 fs/roundtrip, which would break the timing lock maintained by the piezo-actuated mirror 406 and the electro-optic timing shifter 414.

The balanced optical cross-correlator 440 and balanced homodyne detectors 430 provide attosecond resolution measurement of the timing and the carrier envelope phase difference. Precise measurement of the resulting pulse envelope confirms proper temporal overlap and pulse compression. Accurately characterizing a nearly single-cycle pulse with conventional techniques is challenging because increasingly complex schemes are required to reach single-cycle resolution. On the other hand, two-dimensional spectral shearing interferometry (2DSI) has been successfully adopted for the measurement of few-cycle pulses, since it is largely insensitive to bandwidth limitations and provides a direct measurement of spectral group delay without deconvolution ambiguities.

Figure 6:
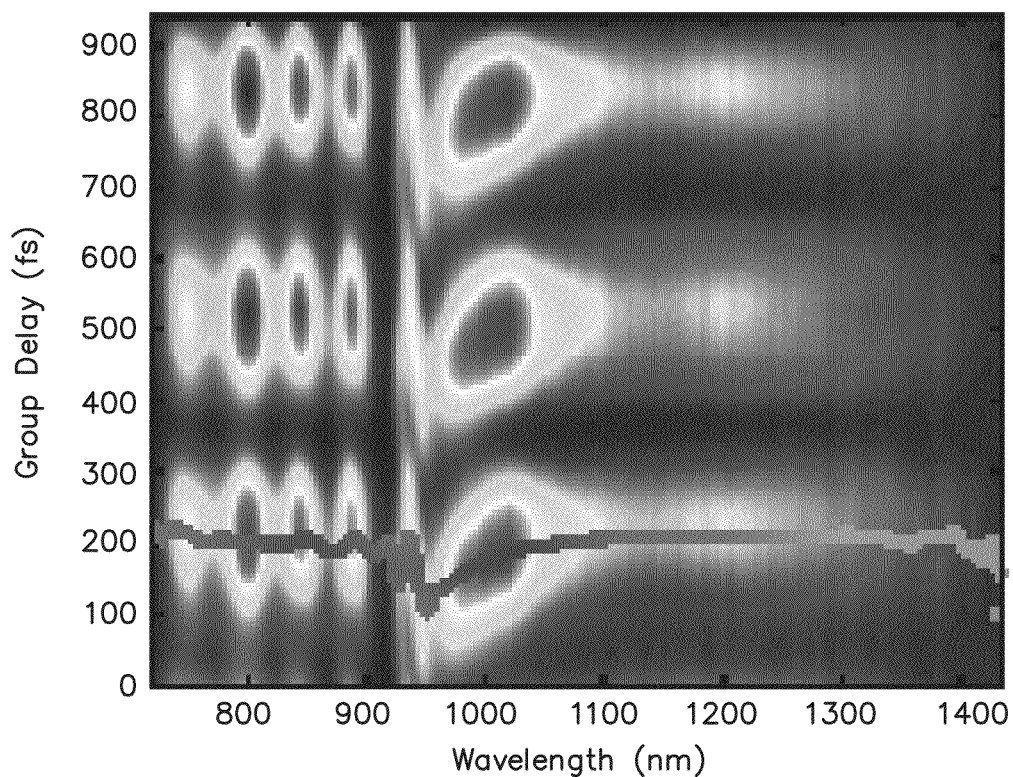
FIG. 6 is a two-dimensional spectral shearing interferogram (2DSI) after synchronization of the lasers in FIG. 4.

FIG. 6 is an interferogram of the synchronized output generated by the 2DSI 450, which measures the spectrum from 650 nm to 1400 nm with a 30 µm thick, Type-II phase matched BBO crystal. The interferogram reveals spectrally flat group delay over the entire bandwidth, with the exception of the portion near 950 nm, where the third-order dispersion of the prisms and double chirped mirrors increases. The spectral group delay (solid line) is retrieved directly from the locations of the interference fringes. Combining the spectral group delay retrieved from the 2DSI 450 with a measurement of the fundamental optical power spectral density yields the complex spectrum.

Figure 7:
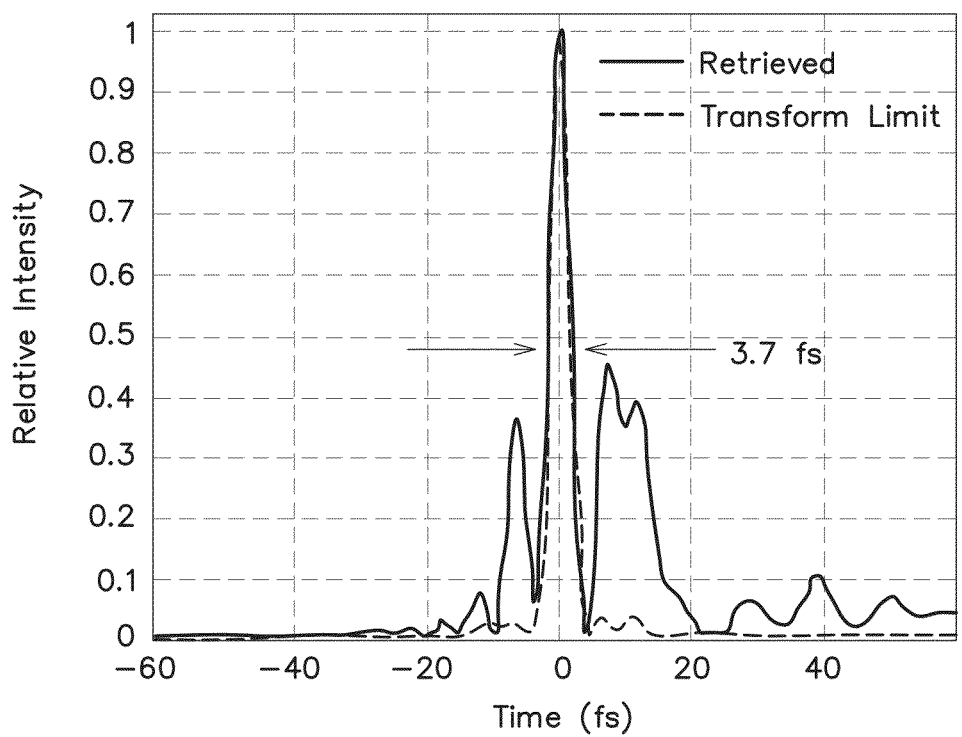
FIG. 7 is a plot of retrieved pulse intensity (solid line) as measured by two-dimensional spectral shearing interferometry (2DSI).

FIG. 7 is a plot of retrieved pulse intensity (solid line) as measured by the 2DSI 450. The central peak of the pulse coincides with the transform limited spectrum, and has a full width half maximum intensity duration of only 3.7 fs, or 1.1 optical cycles at a wavelength of 1 µm. For comparison, the transformed limited spectrum is shown as a dotted line.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for generating a shifted frequency comb having a desired carrier-envelope phase, the system comprising:
    a frequency comb generator to generate a frequency comb;
    a frequency-shifting device, in electromagnetic communication with the frequency comb generator, to receive the frequency comb from the frequency comb generator and to produce the shifted frequency comb based on (i) the frequency comb and (ii) an error signal representative of a phase difference between the shifted frequency comb and a reference signal, the reference signal being representative of the desired carrier-envelope phase; and
    a detector, in electromagnetic communication with the frequency-shifting device, to receive the shifted frequency comb from the frequency-shifting device, to sense the phase difference between the shifted frequency comb and the reference signal, and to provide the error signal to the frequency-shifting device in a feedback loop.

2. The system of claim 1 wherein the phase difference is proportional to the carrier-envelope phase of the shifted frequency comb.

3. The system of claim 2 wherein the frequency-shifting device is further configured to produce the shifted frequency comb by shifting the frequency comb in frequency by an amount proportional to a rate of change associated with the phase difference.

4. The system of claim 1 further comprising:
    a controller to cause the frequency-shifting device to shift one or more first pulses of the frequency comb by a first frequency shift and to shift one or more second pulses of the frequency comb by a second frequency shift.

5. The system of claim 1, further comprising:
    a controller configured to cause the frequency-shifting device to shift at least one first pulse of the frequency comb by a first frequency shift and to cause the frequency-shifting device not to shift a frequency at least one second pulse of the frequency comb.

6. The system of claim 1 wherein the frequency comb generator comprises at least one of a mode-locked laser and a micro-cavity driven by a single-frequency laser.

7. The system of claim 1 wherein the frequency-shifting device comprises at least one of an acousto-optic frequency shifter and a single-sideband phase modulator.

8. The system of claim 1 wherein the detector comprises:
    one or more photodetectors to sense in-phase and quadrature components of the shifted frequency comb relative to the reference signal and to vary a phase of the error signal based on the in-phase and quadrature components.

9. The system of claim 8 further comprising:
    a voltage-controlled oscillator, operably coupled to the detector and the frequency-shifting device, to receive the error signal from the detector and to drive the frequency-shifting device with an output whose oscillation frequency is proportional to the amplitude of the error signal.

10. The system of claim 9, wherein the amplitude of the output of the voltage-controlled oscillator remains substantially constant as the phase difference changes.

11. The system of claim 1 further comprising:
    an interferometer, in electromagnetic communication with the frequency-shifting device and the detector, to produce the reference signal based on the shifted frequency comb and at least one of a decimated version of the shifted frequency comb and a frequency-multiplied version of the shifted frequency comb.

12. The system of claim 1 further comprising:
    a laser, in electromagnetic communication with the frequency-shifting device and the detector, to produce the reference signal.

13. A method of generating a shifted frequency comb using an error signal representative of a phase difference between the shifted frequency comb and a reference signal, the reference signal being representative of a desired carrier-envelope phase of the shifted frequency comb, the method comprising:
    A) shifting a frequency comb in frequency, with a frequency-shifting device, by an amount proportional to the error signal so as to produce the shifted frequency comb;
    B) sensing a phase difference between the shifted frequency comb and the reference signal;
    C) generating the error signal based on the phase difference; and
    D) providing the error signal to the frequency-shifting device in a feedback loop.

14. The method of claim 13, wherein the phase difference is proportional to the carrier-envelope phase of the shifted frequency comb.

15. The method of claim 14, wherein the amount proportional to the error signal depends on the phase difference.

16. The method of claim 14, wherein the amplitude of the error signal remains substantially constant as the phase difference changes.

17. The method of claim 13 further comprising:
    generating the frequency comb.

18. The method of claim 13, wherein A) comprises:
    A1) shifting one or more pulses of the frequency comb by a first frequency shift; and
    A2) shifting one or more second pulses of the frequency comb by a second frequency shift.

19. The method of claim 18, wherein A) further comprises:
    shifting a frequency of at least one first pulse of the frequency comb shift without shifting a frequency of at least one second pulse of the frequency comb shift.

20. The method of claim 13 wherein B) comprises:
    B1) sensing in-phase and quadrature components of the shifted frequency comb relative to the reference signal; and
    B2) varying the phase of the error signal based on the in-phase and quadrature components of the shifted frequency comb.

21. The method of claim 13 further comprising:
    E) driving the frequency-shifting device at an oscillation frequency proportional to the error signal.

22. The method of claim 13, further comprising:
F) producing the reference signal by referencing the shifted frequency comb to at least one of a decimated version of the shifted frequency comb and a frequency-multiplied version of the shifted frequency comb.

23. The method of claim 13, further comprising:
G) generating the reference signal with a laser.

24. A system for generating a shifted frequency comb having a stabilized carrier-envelope phase, the system comprising:
- a mode-locked laser to generate an optical frequency comb;
- an acousto-optic frequency shifter to produce the shifted frequency comb from the optical frequency comb by shifting the optical frequency comb in frequency by an amount proportional to an error signal so as to stabilize the carrier-envelope phase of the shifted frequency comb;
- a self-referencing interferometer to produce a reference signal based on the shifted frequency comb and a frequency-multiplied version of the shifted frequency comb;
- a detector to sense a phase difference between the shifted frequency comb and a reference signal and to produce an error signal based on the phase difference; and
- a voltage-controlled oscillator, operably coupled to the detector, to drive the acousto-optic frequency shifter at a frequency based on a rate of change of the phase difference.

* * * * *